US012718696B2

(12) United States Patent
Liu et al.

(10) Patent No.: US 12,718,696 B2
(45) Date of Patent: Aug. 25, 2026

(54) METHOD FOR TARGET ASSIGNMENT AND ROUTE PLANNING FOR MULTI-AGENT UNMANNED SURFACE VEHICLES

(71) Applicant: Jiangsu University, Zhenjiang (CN)

(72) Inventors: Qingchao Liu, Zhenjiang (CN); Chengzhi Gao, Zhenjiang (CN); Yingfeng Cai, Zhenjiang (CN); Hai Wang, Zhenjiang (CN); Long Chen, Zhenjiang (CN)

(73) Assignee: JIANGU UNIVERSITY, Zhenjiang (CN)

( * ) Notice: Subject to any disclaimer, the term of this patent is extended or adjusted under 35 U.S.C. 154(b) by 0 days.

(21) Appl. No.: 19/117,472

(22) PCT Filed: Sep. 19, 2024

(86) PCT No.: PCT/CN2024/119648

§ 371 (c)(1),
(2) Date: Apr. 1, 2025

(87) PCT Pub. No.: WO2025/118768

PCT Pub. Date: Jun. 12, 2025

(65) Prior Publication Data

US 2026/0011251 A1 Jan. 8, 2026

(30) Foreign Application Priority Data

Dec. 6, 2023 (CN) ........................ 202311663486.2

(51) Int. Cl.
*G08G 3/02* (2006.01)
*B63B 35/00* (2020.01)
(Continued)

(52) U.S. Cl.
CPC ............... *G08G 3/02* (2013.01); *B63B 35/00* (2013.01); *B63B 43/18* (2013.01); *G05D 1/644* (2024.01);
(Continued)

(58) Field of Classification Search
CPC .......... G08G 3/02; B63B 35/00; B63B 43/18; B63B 2035/007; G05D 1/644; G05D 1/693; G05D 2107/25; G05D 2109/34
See application file for complete search history.

(56) References Cited

U.S. PATENT DOCUMENTS 6,354,235 B1 3/2002 Davies
7,765,038 B2 * 7/2010 Appleby ................ F41H 13/00 701/28

(Continued)

FOREIGN PATENT DOCUMENTS

CN 109933067 A 6/2019
CN 112327838 A 2/2021

(Continued)

OTHER PUBLICATIONS

Yuanchang Liu et al., Intelligent multi-task allocation and planning for multiple unmanned surface vehicles (USVs) using self-organising maps and fast marching method, Sep. 2019, ScienceDirect.com, vol. 496m, pp. 180-197. (Year: 2019).*

(Continued)

*Primary Examiner* — Peter D Nolan
*Assistant Examiner* — Demetra R Smith-Stewart
(74) *Attorney, Agent, or Firm* — Cooper Legal Group, LLC

(57) ABSTRACT

The present disclosure discloses a method for target assignment and route planning for multi-agent unmanned surface vehicles (USVs). Task information is transmitted to a task allocator, which identifies unassigned targets and available (Continued)

USVs. Based on a comprehensive cost function considering navigation distance and turning penalties between targets and USVs, a target is assigned to each USV. A path planner then generates a smooth waypoint sequence for each assigned USV and target pair, serving as the navigation path. During navigation, a navigation controller constructs a velocity optimization model according to cooperative collision avoidance and maritime boundary constraints, and controls the USVs in real-time to navigate along the waypoint sequences. The present disclosure achieves efficient matching of multiple targets and multi-agent USVs, generates smooth navigation paths satisfying constraints, and enables intelligent navigation control while meeting cooperative collision avoidance requirements and maritime boundary constraints.

9 Claims, 2 Drawing Sheets

(51) Int. Cl.

| | |
|---|---|
| ***B63B 43/18*** | (2006.01) |
| ***G05D 1/644*** | (2024.01) |
| ***G05D 1/693*** | (2024.01) |
| ***G05D 107/00*** | (2024.01) |
| ***G05D 109/30*** | (2024.01) |

(52) U.S. Cl.

CPC ........ *G05D 1/693* (2024.01); *B63B 2035/007* (2013.01); *G05D 2107/25* (2024.01); *G05D 2109/34* (2024.01)

(56) References Cited

U.S. PATENT DOCUMENTS

| | | | | |
|---|---|---|---|---|
| 9,096,106 | B2 * | 8/2015 | Hanson | B64U 10/25 |
| 10,948,926 | B2 * | 3/2021 | Sarkar | G01C 21/206 |
| 12,145,277 | B2 * | 11/2024 | Lin | B25J 19/02 |
| 2014/0195095 | A1 * | 7/2014 | Flohr | G05D 1/02 701/25 |
| 2019/0139421 | A1 * | 5/2019 | Nilsson | G08G 5/22 |
| 2019/0273409 | A1 * | 9/2019 | Lee | H02K 3/04 |
| 2020/0151463 | A1 * | 5/2020 | Yasunaga | G06V 10/25 |
| 2021/0046929 | A1 * | 2/2021 | Wu | G08G 1/202 |
| 2022/0415183 | A1 | 12/2022 | Hong et al. | |

FOREIGN PATENT DOCUMENTS

| | | | |
|---|---|---|---|
| CN | 112965521 | A | 6/2021 |
| CN | 112987737 | A | 6/2021 |
| CN | 113985893 | A | 1/2022 |
| CN | 114019983 | A | 2/2022 |
| CN | 114088094 | A | 2/2022 |
| CN | 115599093 | A | 1/2023 |
| CN | 116257067 | A | 6/2023 |
| CN | 117742323 | A | 3/2024 |
| JP | 2002316697 | A | 10/2002 |
| WO | 2021022637 | A1 | 2/2021 |

OTHER PUBLICATIONS

Xiaogang, et al., "A survey of mission planning an UAVs systems based on multiple constraints", vol. 15. No. 2, http://kns.cnki.net/kcms/detail/23.1538.tp.20190409.0932.010.html, 14 pages with English abstract.

Zhang, et al., "Cooperative Mission Planning of Multi-Objective Multi-UAV in Complex Environment", 2020, 6 pages with English abstract.

Qian, et al., "Task Assignment Scheme Based on Contract Net", vol. 22 No. 8, Aug. 2011, 5 pages with English abstract.

International Search Report cited in PCT/CN2024/119648, mailed Jan. 12, 2025, 5 pages.

Written Opinion cited in PCT/CN2024/119648, mailed Jan. 12, 2025, 4 pages.

* cited by examiner

METHOD FOR TARGET ASSIGNMENT AND ROUTE PLANNING FOR MULTI-AGENT UNMANNED SURFACE VEHICLES

TECHNICAL FIELD

The present disclosure relates to the technical field of target assignment for unmanned surface vehicles, and more particularly to a method for target assignment and route planning for multi-agent unmanned surface vehicles.

BACKGROUND

In recent years, with the rapid development of artificial intelligence technology and robotics, unmanned surface vehicles have been widely used in the field of marine operations. Especially when performing complex tasks, task collaboration of multi-agent unmanned surface vehicles has become a focus of research.

Target assignment algorithms are one of the key technologies for unmanned platform collaboration. In order to effectively assign tasks and plan routes, many researchers have proposed different algorithms and methods. For example, some studies have adopted particle swarm optimization and genetic algorithms to solve multi-task assignment and route planning problems, and these methods have achieved success in the field of unmanned aerial vehicles.

However, current research has not fully considered the special maneuverability of unmanned surface vehicles relative to other unmanned platforms, such as weaker turning ability and characteristics of being easily disturbed by hydrodynamic forces, as well as constraint conditions existing in sea areas, such as restricted area and task boundaries. In addition, the need for cooperative obstacle avoidance between multi-agent unmanned surface vehicles and targets also needs to be considered. Therefore, it has become very necessary to develop a task assignment and route planning system that can consider the own attitude and direction of unmanned surface vehicles, and can plan in the constrained sea area.

SUMMARY

The present disclosure discloses a method for target assignment and route planning for multiple unmanned surface vehicles (USVs) operating in a cooperative environment. The primary objective is to enhance the collaboration efficiency and overall task success rate of the USV fleet. The method addresses challenges such as task allocation, route optimization considering restricted areas, and dynamic collision avoidance.

The method includes the following key steps:

1. Task Initialization and Identification: A task allocator receives information including the task area, restricted areas, parameters and states of both targets (e.g., location, assignment status) and USVs (e.g., speed, position, assignment status). It identifies unassigned targets ($T_{un}$) and available USVs ($U_{un}$).
2. Target Assignment: A core element of the present disclosure is an adjusted distance-based assignment strategy. For each USV-target pair (i, j), an adjusted distance $$(d'_{ij})$$

is calculated:

$$d'_{ij} = d_{ij} + \Delta d_{ij} + \Omega d_{ij}$$

where $d_{ij}$ is the Euclidean distance, $\Delta d_{ij}$ is a USV performance-based adjustment (considering factors like speed and turning rate), and $\Omega d_{ij}$ is a penalty term for routes that require bypassing restricted areas. An adjusted distance matrix ($D_{m\times n}$) is constructed, and a sub-matrix (D') containing only unassigned USVs and targets is used. The Hungarian algorithm, or a similar minimum-cost matching algorithm, is implicitly applied to D' to find the optimal USV-target assignments based on the minimum adjusted distances.
3. Route Planning: For each assigned USV-target pair, a waypoint sequence ($P_{ij}$) is generated, explicitly considering paths that avoid restricted areas. This sequence is then refined through interpolation (e.g., using B-spline curves) to create a smoother, more navigable waypoint sequence ($P'_{ij}$). This smoothed sequence is transmitted to the USV's navigation system. The detailed process includes dividing the path and finding the shortest route bypassing the restricted areas. A turning penalty is also calculated in this part.
4. Navigation and Dynamic Obstacle Avoidance: A navigation controller on each USV utilizes an optimizer. This optimizer receives the USV's parameters, state, the obstacle set ($Obs_i$), restricted areas ($F_m$), task area (L), and the desired velocity vector ($v_{des}$) towards the next waypoint. The optimizer solves for a velocity control quantity (v) that minimizes a cost function:

$$J(v) = |v_{des} - v|^2 + c_{penalty}(v)$$

subject to constraints such as maximum speed, staying within the task area, and avoiding restricted areas. The USV is driven by this velocity control. Once a waypoint is reached, it's removed from the sequence, and the process continues until the final waypoint (the target location) is reached.
5. Re-assignment: After completing a task, the USV is added back to the set of available USVs ($U_{un}$), and the assignment process (step 2) is repeated until all tasks are completed.

Advantages of the present disclosure comprise:

1. Efficient task assignment strategy: The present disclosure adopts a task assignment algorithm based on an adjusted distance matrix, which not only considers straight-line distance, but also adjusts the distance in combination with performance parameters of unmanned surface vehicles and penalty terms for bypassing restricted area.
2. Detailed route planning: By considering details such as a straight-line path between unmanned surface vehicles and targets, bypassing of restricted area, and smooth processing of routes, the present disclosure ensures that generated waypoints not only meet actual navigation needs, but also avoid unnecessary detours and turns.
3. Dynamic cooperative obstacle avoidance: In navigation, a navigation controller of the present disclosure can real-time detect and adjust navigation attitudes of unmanned surface vehicles to meet cooperative obstacle avoidance and sea area constraints, ensuring that no conflicts occur between multiple unmanned surface vehicles, and also ensuring a safe distance from other targets.

4. Flexibility and scalability: The system design of the present disclosure considers the situation of collaborative work of unmanned surface vehicles with different quantities and different performances, and has good flexibility and scalability, and can adjust parameters and strategies according to actual task needs.
5. Adaptability: Parameters such as speed and turning rate of unmanned surface vehicles, and factors such as quantity and position of targets may change in practical applications, and the system of the present disclosure can real-time adjust task assignment and route planning according to these parameters to ensure real-time performance and adaptability of the system.

BRIEF DESCRIPTION OF THE DRAWINGS

In order to facilitate a better understanding of the present application, various forms thereof given as examples will now be described with reference to the accompanying drawings, in which.

The accompanying drawings are for illustrative purposes only and are not intended to limit the scope of protection of the present application in any way or form.

DETAILED DESCRIPTION OF THE EMBODIMENTS

Hereinafter, various embodiments shown in the accompanying drawings will be described in detail with reference to the accompanying drawings. However, these embodiments do not limit the present disclosure, and structural, methodological, or functional changes made by those of ordinary skill in the art based on these embodiments are all included in the protection scope of the present disclosure.

Figure 1:
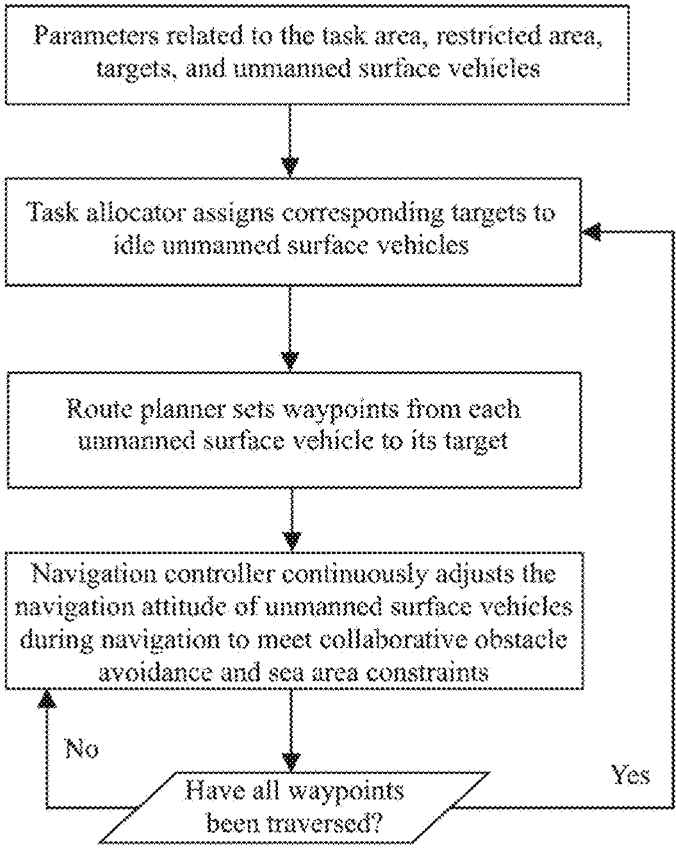
FIG. 1 is a flowchart of target assignment and route planning for multi-agent unmanned surface vehicles according to the present disclosure.

As shown in FIG. 1, a method for target assignment and route planning for multi-agent unmanned surface vehicles of the present disclosure includes the following steps:

Step 1., an upper-level command controller sends task information to a task allocator, wherein the task information includes a task area, restricted area, related parameters of targets, and related parameters of unmanned surface vehicles; the task allocator performs the following processing on the received task information:

S11, setting an irregular sea area L (i.e., a task area), which is a convex polygon defined by $n_a$ two-dimensional coordinates meeting a WGS84 standard;

S12, setting $n_f$ irregular restricted area $F_1 \ldots F_{n_f}$, each restricted area being a convex polygon defined by $$n_{a1} \ldots\ldots n_{a_{n_f}}$$

two-dimensional coordinates meeting a WGS84 standard;

S13, setting parameters and state quantities of $n_u$ unmanned surface vehicles, including a unique identifier $id_i$, a maximum speed $V_i$, a turning rate $\omega_i$, a search radius $r_i$, whether a task has been assigned $b_{assign,i}$, a current position $p_i$, and a current velocity vector $v_i$, which are formed into a data structure and stored in the task allocator, and corresponding to connected unmanned surface vehicle real machines one-to-one;

S14, setting parameters and state quantities of $m_t$ targets to be completed, including a unique identifier $id_j$, whether it has been assigned $b_{target,j}$, a work area radius $r_j$, and a current position $q_j$, serving as a structure and stored in the task allocator, and corresponding to targets one-to-one; targets can be dynamically added or deleted;

S15, identify unassigned targets $T_{un}$ and unmanned surface vehicles without assigned tasks $U_{un}$ through the state quantities of the targets and unmanned surface vehicles, serving as initial inputs for each task assignment.

Figure 2:
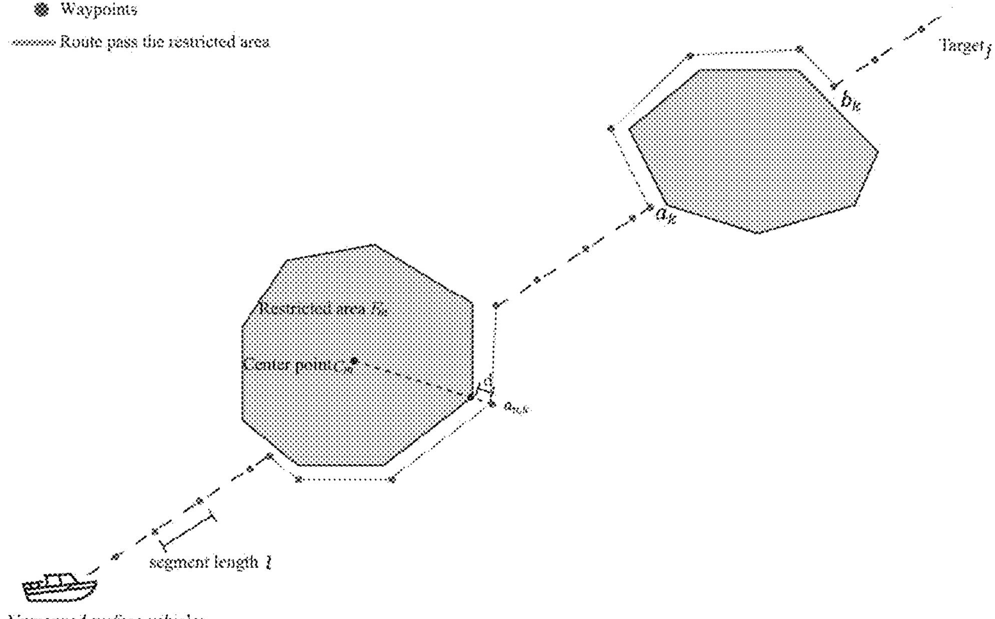
FIG. 2 is a schematic diagram of obtaining a penalty term for the target j bypassing restricted area from the unmanned surface vehicle i according to the present disclosure.

Step 2., the task allocator assigns a corresponding target to each unmanned surface vehicle, specifically including:

S21, calculating an adjusted distance $$d'_{ij}$$

from each target j to each unmanned surface vehicle i, given by the following formula:

$$d'_{ij} = d_{ij} + \Delta d_{ij} + \Omega d_{ij}$$

wherein, $d_{ij}$ is the Euclidean distance from the i-th unmanned surface vehicle to the j-th target; $\Delta d_{ij}$ is an adjustment term considering performance parameters of the unmanned surface vehicle for the distance, given by the following formula:

$$\Delta d_{ij} = \omega_1 \frac{|v_i|\cos\theta_{ij} - V_i}{V_i} + \omega_2 \frac{|\theta_i - \theta_{ij}|}{\omega_i}$$

wherein, $v_i$ is a velocity vector of the i-th unmanned surface vehicle, $\theta_i$ is a direction of the velocity vector, $V_i$ is a maximum speed, $\omega_i$ is a maximum turning rate, $\theta_{ij}$ is an azimuth angle from the i-th unmanned surface vehicle pointing to the j-th target, $\omega_1$, $\omega_2$ are weighting coefficients, and specific values are set according to different unmanned surface vehicle models, which are set to 0.7, 0.3 respectively in this embodiment; referring to FIG. 2, specific steps for calculating the penalty term $\Omega d_{ij}$ for each target j bypassing restricted area from the unmanned surface vehicle i are as follows:

1. dividing a straight-line path from the unmanned surface vehicle i to the target j into N equal segments, each segment having a length of l, and endpoints of each segment being denoted as sampling points $P_0 \ldots P_k \ldots P_N$, with the unmanned surface vehicle as a sampling point $P_0$;
2. for values of k from 0 to N−1, determining whether a connecting line $P_kP_{k+1}$ intersects with a boundary of a restricted area $F_m$, and if intersecting, denoting a first intersection point and a last intersection point as $a_k$, $b_k$ respectively, and deleting sampling points between $a_k$, $b_k$;

3. finding a point $n_k$ on the boundary of $F_m$ that is closest to $a_k$;
4. calculating a point $a_{n,k}$ obtained by extending from $n_k$ outwards along a normal vector direction away from a center point cm of $F_m$ by a distance d (set according to a range size of the restricted area);
5. starting from $a_{n,k}$, traversing boundary points of $F_m$ outwards by a distance d in clockwise and counter-clockwise directions to obtain points $a_{n,k+i}$, until a connecting line between $a_{n,k+i}$ and $b_k$ does not intersect with $F_m$, and recording path lengths in clockwise and counter-clockwise directions $L_{cw}$, $L_{ccw}$ respectively;
6. selecting a smaller value from Low and $L_{ccw}$, and denoting it as Lk;
7. adding path points bypassing $F_m$, i.e., points in Lk, between the sampling points $a_k$, $b_k$, and repeating steps 2. to 6. to process subsequent restricted area $F_{m+i}$;
8. finally obtaining a sampling point sequence P as a path bypassing all $F_m$, i.e., the sampling point sequence P is composed of $N_p$ waypoints, and a length thereof being $\Omega d'_{ij}$;
9. for the sampling point sequence P, calculating a turning angle $\theta_k$ between each adjacent sampling line segment $P_kP_{k+1}$ and $P_{k+1}P_{k+2}$;
10. calculating a path turning penalty term:

$$\Omega\omega = \sum_{k=1}^{N_p-1} \omega_k \theta_k^2,\ \omega_k$$

being a turning penalty parameter;

11. finally, the penalty term $\Omega d_{ij}$ for each target j bypassing restricted area from the unmanned surface vehicle i is a sum of navigation distance and turning penalty: $\Omega d_{ij} = \Omega d_{ij}' + \Omega\omega$.

S22, the task allocator assigns a target $t_j$ to each unmanned surface vehicle $u_i$, wherein the unmanned surface vehicle $u_i$ belongs to unmanned surface vehicles without assigned tasks $U_{un}$, and the target $t_j$ belongs to unassigned targets $T_{un}$; specifically including:

1. defining an unmanned surface vehicle set $U_{un}=\{u_1, u_2, \ldots, u_i, \ldots, u_m\}$, and a target set $T_{un}=\{t_1, t_2, \ldots, t_j, \ldots t_n\}$, wherein m and n are respectively a quantity of unmanned surface vehicles to be assigned and a quantity of targets to be assigned, serving as initial inputs for each task assignment;
2. constructing an adjusted distance matrix $D_{m\times n}$ between unmanned surface vehicles and targets by $d'_{ij}$;
3. initializing an assignment result of each unmanned surface vehicle $u_i$ to null, i.e., match $(u_i)$=null;
4. defining a sub-matrix D', $D' \in D_{m\times n}$, D' including rows and columns corresponding to unmanned surface vehicles and targets that have not been assigned yet;
5. finding a minimum element $d'_{ij}$ in the sub-matrix D', and determining a target $t_j$ assigned to the unmanned surface vehicle $u_i$ by a row and a column of the minimum element;
6. if the target $t_j$ has not been assigned yet, assigning $u_i$ to $t_j$, and setting match $(u_i)=t_j$;
7. deleting the i-th row and the j-th column from D', indicating that corresponding unmanned surface vehicles and targets have been matched; 8. repeating steps 5. to 7. until all unmanned surface vehicles and targets to be assigned have been matched.

S23, marking unmanned surface vehicles and targets in the matching result match $(u_i)$ as having been assigned, specifically:

1. for each unmanned surface vehicle $u_i$ in the matching result match $(u_i)$, marking its $b_{assign,\ i}$ as True;
2. for each target t; in the matching result match $(u_i)$, marking its $b_{target,\ j\ as\ True;}$;

removing the unmanned surface vehicles marked as assigned from $U_{un}$, and removing the targets marked as assigned from $T_{un}$.

Step 3., a route planner (set on the unmanned surface vehicle) sets waypoints from itself to a target for each unmanned surface vehicle, specifically including:

S31, for the matched unmanned surface vehicles and corresponding targets, referring to the waypoint sequence $P_{ij}$ bypassing restricted area from the unmanned surface vehicle $u_i$ to the target $t_j$ calculated in S21;

S32, interpolating $P_{ij}$ by using a cubic B-spline interpolation algorithm to generate a new waypoint sequence $P'_{ij}$, specific steps are as follows:

1. constructing a cubic B-spline curve C(u) by using $P_{ij}$ as a control point sequence;
2. defining a turning energy function $E_b=\iint \ddot{C}^2(u)du$, representing turning energy;
3. defining a route length function $E_l=\int|\dot{C}(u)|du$, representing route length;
4. constructing an objective function $E=w_1E_b+w_2E_l$, wherein $w_1$, $w_2$ are weighting coefficients;
5. minimizing the objective function by adjusting $w_1$, $w_2$ values to obtain a smooth curve $C^*(u)$;
6. sampling the $C^*(u)$ curve, with a distance between sampling points being l', to generate a new waypoint sequence $P_{tij}$;
7. deleting points in the new waypoint sequence $P_{tij}$ that are within restricted area or in a task area to obtain the sequence $P'_{ij}$.

S33, using the sequence $P'_{ij}$ as a navigation waypoint sequence from the unmanned surface vehicle $u_i$ to the target $t_j$, and sending and storing it in a navigation system of a corresponding unmanned surface vehicle.

Step 4., a navigation controller on the unmanned surface vehicle real machine continuously adjusts a navigation attitude of the unmanned surface vehicle in navigation to meet cooperative obstacle avoidance and sea area constraint requirements, specifically including:

S41, in each time step dt of solving by the optimizer, for each unmanned surface vehicle $u_i$, checking whether there are other unmanned surface vehicles $u_j(i\neq j)$ or targets $t_k$ within a search radius $r_i$, and if yes, adding the other unmanned surface vehicles $u_j(i\neq j)$ or targets $t_k$ to an obstacle set $Obs_i$;

calculating an expected velocity vector $v_{des}$ of the unmanned surface vehicle $u_i$ to its next waypoint $P_i \in P'_{ij}$, wherein a direction is a unit vector from $u_i$ to $P_i$, and a magnitude is a maximum speed $V_i$;

S42, inputting parameters and state quantities of the unmanned surface vehicle $u_i$, the obstacle set $Obs_i$, the restricted area $F_m$, the task area L, and the expected velocity vector $v_{des}$ into the optimizer to perform a solving operation, specific steps are as follows:

1. the optimizer constructs an objective function:

$$J(v) = |v_{des} - v|^2 + c_{penalty}(v)$$

wherein, v is an optimization variable, representing a velocity control vector of the unmanned surface vehicle; $c_{penalty}$ is a penalty term to prevent the unmanned surface vehicle from running still after falling into a local optimum, when v is less than max $(0.8*v_{des}, 0.8*V_i)$, $c_{penalty}$ is 100, otherwise it is 0.

2. the optimizer constructs constraint conditions:

$c_1$:$|v|\leq V_i$, ensuring that a speed is less than a maximum speed;

$c_2$: $P_{next}\notin F_m$, ensuring that a future position is not within restricted area;

$c_3$: $p_{next}\in L$, ensuring that a future position is within a task area, wherein, $p_{next}=P_i+v\cdot dt$ is a next moment position calculated according to a velocity control quantity v.

3. using an SLSQP algorithm to solve for a velocity control quantity v* that minimizes the objective function J(v):

$$\min_v J(v) \text{ s.t. } c_1, c_2, c_3$$

outputting the solved v* as the velocity control quantity.

S43, using the velocity control quantity v* to drive the unmanned surface vehicle $u_i$ to travel towards the target waypoint $P_i$, and after reaching the waypoint, deleting $P_i$ from the waypoint sequence $$P'_{ij}$$

until reaching a last waypoint in the waypoint sequence $$P'_{ij},$$

i.e., reaching a task area of the target $t_j$, and after performing a task, adding the unmanned surface vehicle $u_i$ to $U_{un}$ again, and restarting step 2, until all tasks are completed.

Figure 3:
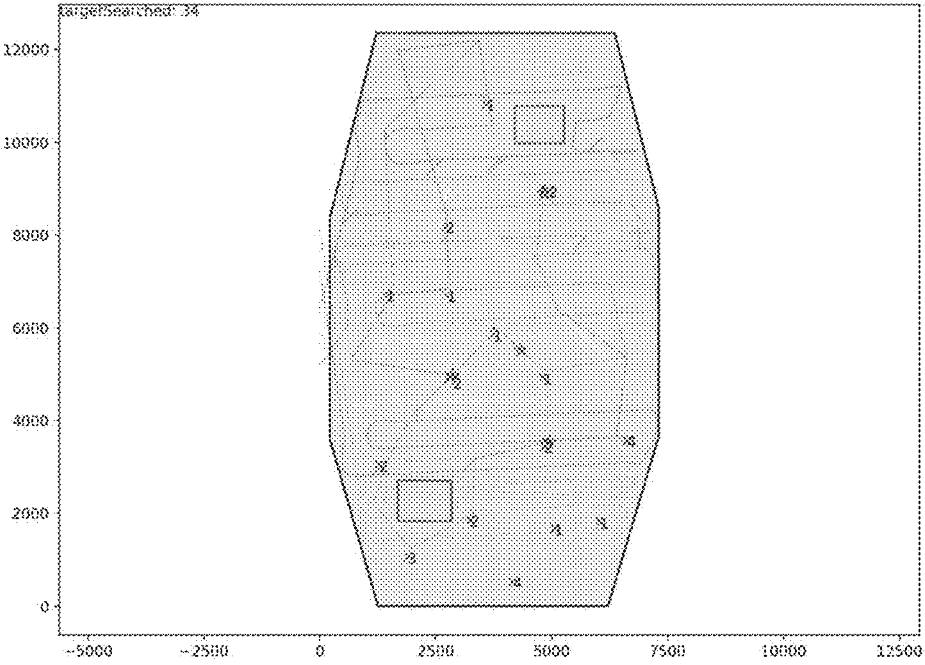
FIG. 3 is a diagram of a real machine operation interface of the method according to the present disclosure.

FIG. 3 is a diagram of a real machine operation interface of a method for collaborative target assignment and route planning for multi-agent unmanned surface vehicles according to the present application. It should first be clarified that FIG. 3 is only present as an exemplary diagram and cannot limit the scope of the present application.

The above embodiments are used solely to illustrate the technical solution of the present application and are not intended to limit it. Although the present application has been described in detail with reference to the aforementioned embodiments, those of ordinary skill in the art should understand that they can still modify the technical solutions described in the aforementioned embodiments or replace some of the technical features with equivalent ones. Such modifications or replacements do not cause the essence of the corresponding technical solutions to depart from the spirit and scope of the technical solutions of the embodiments of the present application, and should all be included within the scope of protection of the present application.

The invention claimed is:

1. A method for target assignment and route planning for multi-agent unmanned surface vehicles, comprising:

receiving task information by a task allocator, wherein the task information comprises a task area, restricted area, parameters and state quantities of targets, and parameters and state quantities of unmanned surface vehicles;

identifying a set of unassigned targets $T_{un}$ and a set of unmanned surface vehicles without assigned tasks $U_{un}$ through the parameters and state quantities of the targets and unmanned surface vehicles;

assigning a corresponding target to each unmanned surface vehicle, comprising: calculating an adjusted distance $$d'_{ij}$$

from each target j to each unmanned surface vehicle i:

$$d'_{ij} = d_{ij} + \Delta d_{ij} + \Omega d_{ij}$$

wherein, $d_{ij}$ is the Euclidean distance from the i-th unmanned surface vehicle to the j-th target, $\Delta d_{ij}$ is an adjustment term considering performance parameters of the unmanned surface vehicle for the distance, and $\Omega d_{ij}$ is a penalty term for the j-th target bypassing restricted area from the i-th unmanned surface vehicle;

constructing an adjusted distance matrix $D_{m\times n}$ between unmanned surface vehicles and targets by $$d'_{ij},$$

defining a sub-matrix D', $D'\in D_{m\times n}D'$ comprising rows and columns corresponding to unassigned unmanned surface vehicles $u_i$ and targets $t_j$, and matching the unassigned unmanned surface vehicles $u_i$ and targets $t_j$ based on a minimum element in D'; wherein the unmanned surface vehicle $u_i$ belongs to the set of unmanned surface vehicles without assigned tasks $U_{un}$, and the target $t_j$ belongs to the set of unassigned targets $T_{un}$;

wherein a process for obtaining the penalty term for each target j bypassing restricted area from the unmanned surface vehicle i is:

1) Dividing a straight-line path from the unmanned surface vehicle i to the target j into N equal segments, each segment having a length of l, and endpoints of each segment being denoted as sampling points $P_0 \ldots P_k \ldots P_N$;

2) Determining whether a connecting line $P_kP_{k+1}$ intersects with a boundary of a restricted area $F_m$, and if intersecting, denoting a first intersection point and a last intersection point as $a_k$, $b_k$ respectively, and deleting sampling points between $a_k$, $b_k$;

3) Finding a point $n_k$ on the boundary of $F_m$ that is closest to $a_k$;

4) Calculating a point $a_{n,k}$ obtained by extending from $n_k$ outwards along a normal vector direction away from a center point $c_m$ of $F_m$ by a distance d;

5) Starting from $a_{n,k}$, traversing boundary points of $F_m$ outwards by a distance d in clockwise and counter-clockwise directions respectively to obtain points $a_{n,k}+i$, until a connecting line between $a_{n,k+i}$ and $b_k$ does not intersect with $F_m$, and recording path lengths in clockwise and counter-clockwise directions $L_{cw}$, $L_{ccw}$ respectively;

6) Selecting a smaller value from $L_{cw}$ and $L_{ccw}$, and denoting it as $L_k$;

7) Adding path points bypassing $F_m$, i.e., points in $L_k$, between the sampling points $a_k$, $b_k$, and repeating the steps 2 to 6 to process subsequent restricted area $F_{m+i}$;

8) Finally obtaining a sampling point sequence P as a path bypassing all $F_m$, and a length thereof being $$\Omega d'_{ij};$$

9) For the sampling point sequence P, calculating a turning angle $\theta_k$ between each adjacent sampling line segment $P_kP_{k+1}$ and $P_{k+1}P_{k+2}$;

10) calculating a path turning penalty term:

$$\Omega\omega = \sum_{k=1}^{N_p-1} \omega_k \theta_k^2, \omega_k$$

being a turning penalty parameter; and

11) The penalty term $\Omega d_{ij}$ for each target j bypassing restricted area from the unmanned surface vehicle i is: $\Omega d_{ij}=\Omega d_{ij}'+\Omega\omega$;

for the matched unmanned surface vehicles and corresponding targets, calculating to obtain a waypoint sequence $P_{ij}$ bypassing restricted area from the unmanned surface vehicle $u_i$ to the target $t_j$, and interpolating $P_{ij}$ to generate a new waypoint sequence $P'_{ij}$; using the sequence $P'_{ij}$ as a navigation waypoint sequence from the unmanned surface vehicle $u_i$ to the target t, and sending and storing it in a navigation system of a corresponding unmanned surface vehicle;

inputting parameters and state quantities of the unmanned surface vehicle $u_i$, an obstacle set $Obs_i$, restricted area $F_m$, a task area L, and an expected velocity vector $v_{des}$ of the unmanned surface vehicle $u_i$ to its next waypoint $P_i \in P'_{ij}$ into an optimizer, and solving to obtain a velocity control quantity; and using the velocity control quantity to drive the unmanned surface vehicle $u_i$ to travel towards the target waypoint $P_i$, and after reaching the waypoint, deleting $P_i$ from the waypoint sequence $$P'_{ij}$$

until reaching a fast waypoint in the waypoint sequence $$P'_{ij},$$

i.e., reaching a task area of the target $t_j$, and after performing a task, adding the unmanned surface vehicle $u_i$ to $U_{un}$ again, and restarting step 2, until all tasks are completed.

2. The method for target assignment and route planning for multi-agent unmanned surface vehicles according to claim 1, wherein the adjustment term considering performance parameters of the unmanned surface vehicle for the distance is calculated according to the following formula:

$$\Delta d_{ij} = \omega_1 \frac{|v_i|\cos\theta_{ij} - V_i}{V_i} + \omega_2 \frac{|\theta_i - \theta_{ij}|}{\omega_i}$$

wherein, $v_i$ is a velocity vector of the i-th unmanned surface vehicle, $\theta_i$ is a direction of the velocity vector, $V_i$ is a maximum speed, $\omega_i$ is a maximum turning rate, $\theta_{ij}$ is an azimuth angle from the i-th unmanned surface vehicle pointing to the j-th target, and $\omega_1$, $\omega_2$ are weighting coefficients.

3. The method for target assignment and route planning for multi-agent unmanned surface vehicles according to claim 1, wherein interpolating $P_{ij}$ to generate a new waypoint sequence $$P'_{ij}$$

specifically adopts the following method:

1) Constructing a cubic B-spline curve C(u) by using $P_{ij}$ as a control point sequence;

2) Defining a turning energy function $E_b=\iint \ddot{C}^2(u)du$, representing turning energy;

3) Defining a route length function $E_l=\int|\dot{C}(u)|du$, representing route length;

4) Constructing an objective function $E=w_1E_b+w_2E_l$, wherein $w_1$, $w_2$ are weighting coefficients;

5) Minimizing the objective function by adjusting $w_1$, $w_2$ values to obtain a smooth curve $C^*(u)$;

6) Sampling the $C^*(u)$ curve to generate a new waypoint sequence $P_{tij}$; and 7) Deleting points in the new waypoint sequence $P_{tij}$ that are within restricted area or in a task area to obtain the sequence $$P'_{ij}.$$

4. The method for target assignment and route planning for multi-agent unmanned surface vehicles according to claim 1, wherein an objective function of the optimizer is:

$$J(v) = |v_{des} - v|^2 + c_{penalty}(v)$$

wherein, v is an optimization variable, $c_{penalty}$ is a penalty term.

5. The method for target assignment and route planning for multi-agent unmanned surface vehicles according to claim 4, wherein constraint conditions constructed by the optimizer are:

$c_1$: $|v| \le V_i$, ensuring that a speed is less than a maximum speed $V_i$;

$c_2$: $p_{next} \notin F_m$, ensuring that a future position is not within restricted area $F_m$; and $c_3$: $p_{next} \in L$, ensuring that a future position is within a task area L;

wherein, $p_{next}=P_i+v \cdot dt$ is a next moment position calculated according to a velocity control quantity v.

6. The method for target assignment and route planning for multi-agent unmanned surface vehicles according to claim 5, comprising solving for a velocity control quantity $v^*$ that minimizes the objective function J(v):

$$\min_v J(v) \text{ s.t. } c_1, c_2, c_3$$

using the solved $v^*$ as the velocity control quantity.

7. The method for target assignment and route planning for multi-agent unmanned surface vehicles according to claim 6, wherein in each time step dt of solving by the optimizer, for each unmanned surface vehicle $u_i$, checking whether there are other unmanned surface vehicles $u_j$ or targets $t_k$ within a search radius, and if yes, adding the other unmanned surface vehicles $u_j$ or targets $t_k$ to an obstacle set $Obs_i$.

8. The method for target assignment and route planning for multi-agent unmanned surface vehicles according to claim 1, wherein the parameters and state quantities of the unmanned surface vehicles comprise a unique identifier, a maximum speed, a turning rate, a search radius, whether a task has been assigned, a current position, and a current velocity vector; the parameters and state quantities of the targets comprise a unique identifier, whether it has been assigned, a work area radius, and a current position.

9. The method for target assignment and route planning for multi-agent unmanned surface vehicles according to claim 1, wherein the task area is a convex polygon defined by a plurality of two-dimensional coordinates meeting a WGS84 standard; and the restricted area are convex polygons defined by a plurality of two-dimensional coordinates meeting the WGS84 standard.

* * * * *